(12) United States Patent
Dowling et al.

(10) Patent No.: US 11,150,627 B2
(45) Date of Patent: Oct. 19, 2021

(54) SYSTEM AND METHOD FOR MONITORING CONDITIONS ASSOCIATED WITH OPERATION OF AN UNDERGROUND MACHINE

(71) Applicant: Caterpillar Underground Mining Pty. Ltd., South Burnie (AU)

(72) Inventors: Alexander E. Dowling, Burnie (AU); Rhys J. Oldridge, Ulverstone (AU)

(73) Assignee: Caterpillar Underground Mining Pty. Ltd., Tasmania (AU)

( * ) Notice: Subject to any disclaimer, the term of this patent is extended or adjusted under 35 U.S.C. 154(b) by 109 days.

(21) Appl. No.: 16/227,693

(22) Filed: Dec. 20, 2018

(65) Prior Publication Data
US 2019/0187663 A1    Jun. 20, 2019

(30) Foreign Application Priority Data
Dec. 20, 2017    (AU) .............................. 2017279683

(51) Int. Cl.
   *G05B 19/406*    (2006.01)
(52) U.S. Cl.
   CPC .. *G05B 19/406* (2013.01); *G05B 2219/34465* (2013.01)
(58) Field of Classification Search
   CPC .. G05B 19/406; G01C 21/165; G01C 25/005; G08G 1/166; G08G 1/129
   See application file for complete search history.

(56) References Cited

U.S. PATENT DOCUMENTS

| | | | |
|---|---|---|---|
| 5,531,122 A * | 7/1996 | Chatham | G01B 5/30 340/438 |
| 5,854,843 A | 12/1998 | Jacknin et al. | |
| 6,616,244 B2 | 9/2003 | Hakkinen | |
| 6,898,501 B2 * | 5/2005 | Schubert | B60G 17/0165 180/89.12 |
| 7,756,615 B2 | 7/2010 | Barfoot et al. | |
| 7,908,928 B2 * | 3/2011 | Vik | G01M 5/0041 73/806 |
| 7,953,559 B2 * | 5/2011 | Sundermeyer | G01N 3/32 702/33 |

(Continued)

FOREIGN PATENT DOCUMENTS

CN    202033028 U    11/2011
WO    WO 2002/039073 A1    5/2002

*Primary Examiner* — Helen C Kwok
(74) *Attorney, Agent, or Firm* — von Briesen & Roper, s.c.

(57) ABSTRACT

A system for monitoring conditions associated with operation of an underground machine includes a sensor that is disposed on the machine. The sensor is configured to output tri-axial acceleration data associated with the underground machine. The system also includes at least one controller that is disposed in communication with the sensor. The at least one controller is configured to evaluate the tri-axial acceleration data with at least one pre-defined criteria, and determine whether the tri-axial acceleration data is in excess of a threshold associated with the at least one pre-defined criteria based on the evaluation. The controller is also configured to record an occurrence of an abnormality in the condition associated with operation of the underground machine on the basis of whether the tri-axial acceleration data is in excess of a threshold associated with the at least one pre-defined criteria.

20 Claims, 6 Drawing Sheets

(56) References Cited

U.S. PATENT DOCUMENTS

| | | | | |
|---|---|---|---|---|
| 8,812,233 | B2* | 8/2014 | Kontz | G01C 19/5776 |
| | | | | 701/502 |
| 9,483,056 | B2* | 11/2016 | Kanai | G08G 1/165 |
| 9,598,845 | B2 | 3/2017 | Baba et al. | |
| 2008/0109141 | A1* | 5/2008 | Nichols | E02F 3/842 |
| | | | | 701/50 |
| 2008/0243344 | A1* | 10/2008 | Casey | E02F 9/262 |
| | | | | 701/50 |
| 2012/0143434 | A1* | 6/2012 | Donnelli | B60P 1/045 |
| | | | | 701/33.4 |
| 2014/0303923 | A1* | 10/2014 | Friend | G01C 21/165 |
| | | | | 702/94 |
| 2014/0371947 | A1* | 12/2014 | Stratton | G01C 7/04 |
| | | | | 701/1 |
| 2017/0169626 | A1* | 6/2017 | Thomsen | G01C 21/165 |
| 2018/0016767 | A1* | 1/2018 | Ge | E02F 9/205 |

\* cited by examiner

SYSTEM AND METHOD FOR MONITORING CONDITIONS ASSOCIATED WITH OPERATION OF AN UNDERGROUND MACHINE

CROSS-REFERENCE TO RELATED APPLICATION

This application claims priority under 35 USC § 119 and the Paris Convention to Australian Patent Application No. 2017279683 filed on Dec. 20, 2017.

TECHNICAL FIELD

The present disclosure relates to an underground machine. More particularly, the present disclosure relates to a system and a method for monitoring conditions associated with operation of an underground machine.

BACKGROUND

Machines used to perform operations in an underground environment, such as a mine, are well known in the art. These machines could include, for example, articulated trucks, wheel loaders, and other types of machines that are capable of performing specific operations in the underground environment. As these machines typically experience harsh working conditions in the underground environment, it may be possible for these machines to deteriorate in performance and entail a shortened service life.

In some cases, these machines may be designed to encounter impacts, for example, from striking with a wall of the mine. These impacts may occur as a result of an operator's inattentiveness when operating the machine and/or due to local environment conditions that are unavoidable by the machine, for example, owing to structural characteristics associated with a wall of the mine. However, such impacts have potential to shorten the service life of the machine. Forces from these impacts, if undetected, may facilitate continued operation of the machine by the operator while the operator lacks awareness of any impending contingency that may be possible with further use of the machine. Even if no significant damage has been caused to the machine, the operator may continue to use or inadvertently misuse the machine often leading to an abuse of the machine and/or posing a hazard to the operator. Further, it may be difficult to implement corrective measures in an operator's behavior for operating the machine properly without monitoring these forces when the machine is being operated, particularly, in the event of an impact.

As these impacts may, in extreme cases, render the machine incapacitated leading to an unproductive downtime of the machine, it may be prudent to incorporate a system for monitoring conditions that are associated with operation of the machine. Hence, there is a need for a system that, when implemented for use in an underground machine, can facilitate operation of the machine in an appropriate manner and hence, improve productivity from use of the machine while overcoming the afore-mentioned drawbacks.

SUMMARY OF THE DISCLOSURE

In an aspect of the present disclosure, a system for monitoring conditions associated with operation of an underground machine includes a sensor that is disposed on the machine. The sensor is configured to output tri-axial acceleration data associated with the underground machine. The system also includes at least one controller that is disposed in communication with the sensor. The at least one controller is configured to evaluate the tri-axial acceleration data with at least one pre-defined criteria, and determine whether the tri-axial acceleration data is in excess of a threshold associated with the at least one pre-defined criteria based on the evaluation. The controller is also configured to record an occurrence of an abnormality in the condition associated with operation of the underground machine on the basis of whether the tri-axial acceleration data is in excess of the threshold associated with the at least one pre-defined criteria.

In another aspect of the present disclosure, a method for monitoring conditions associated with operation of an underground machine includes providing, by means of a sensor, tri-axial acceleration data associated with the underground machine. The method then includes evaluating, by means of a controller, the tri-axial acceleration data with at least one pre-defined criteria, and determining, by means of the controller, whether the tri-axial acceleration data is in excess of a threshold associated with the at least one pre-defined criteria based on the evaluation. The method also includes recording an occurrence of an abnormality in the condition associated with operation of the underground machine on the basis of whether the tri-axial acceleration data is in excess of a threshold associated with the at least one pre-defined criteria.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts. With reference to the drawings, the claims, and the specification, the present disclosure is directed to a system 100 and a method 600 for monitoring conditions associated with operation of an exemplary underground machine 102.

Figure 1:
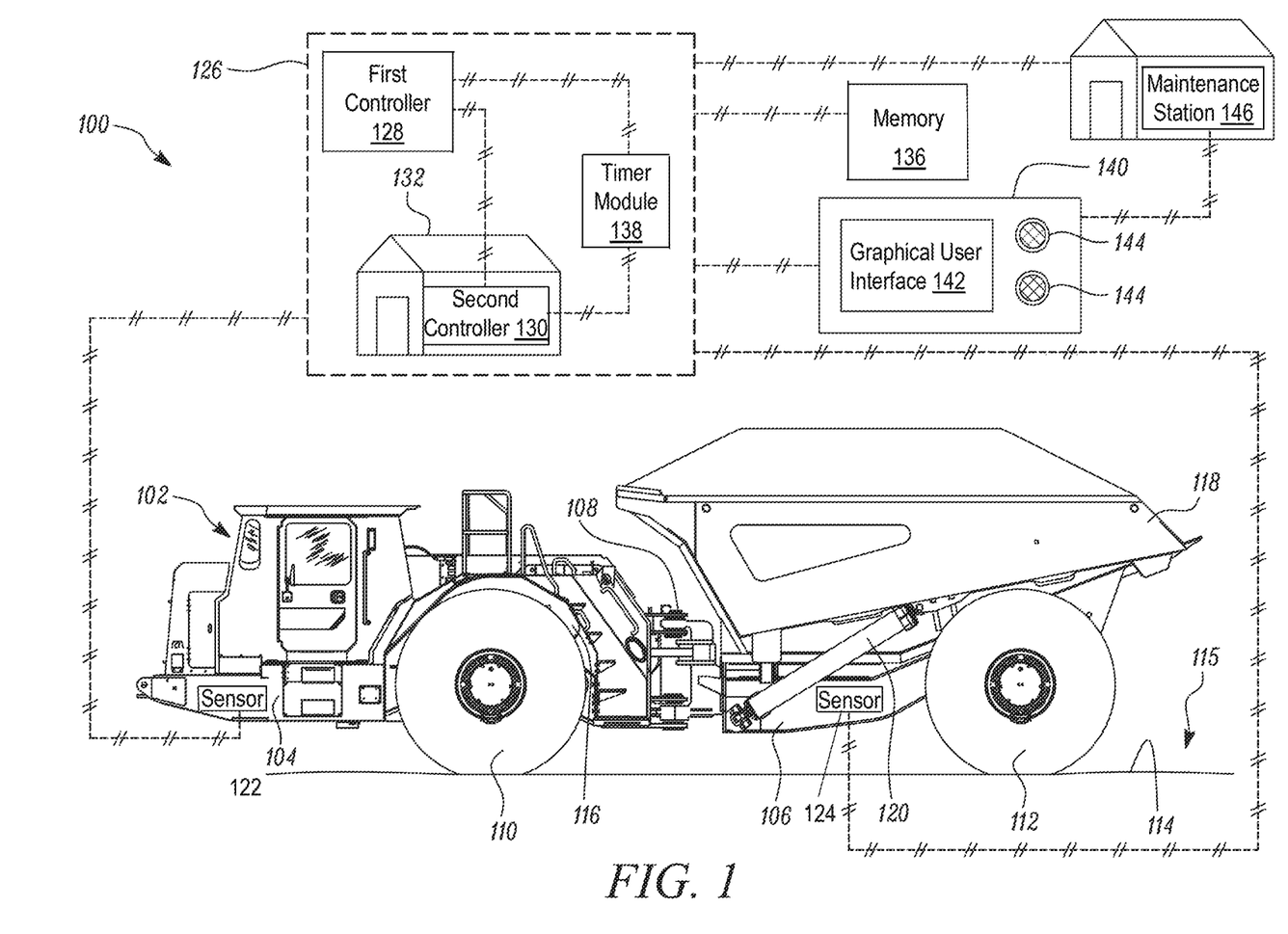
FIG. 1 is a side view of an exemplary machine that may be used in an underground environment, in accordance with an embodiment of the present disclosure.

Referring to FIG. 1, the machine 102 is shown as an underground articulated truck (UAT). Although the machine depicted in the illustrated embodiment of FIG. 1 is embodied as an UAT, in other embodiments, the machine 102 may embody other mobile machines, for example, a dump truck, a wheel loader or any other type of machine that is configured to perform one or more operations associated with the mining industry.

As shown in the illustrated embodiment of FIG. 1, the machine 102 includes a front frame 104 and a rear frame 106 that can be swiveled relative to one another by means of an articulated joint 108. Although the front frame 104 and the rear frame 106 are disclosed herein, it may be noted that a number of frames present on the machine 102 are merely exemplary in nature and hence, non-limiting of this disclosure. It is hereby contemplated that in other embodiments of this disclosure, depending upon a type of machine used and other specific requirements of an application, the machine 102 may be configured such that a singular frame may be used in lieu of the multiple frames disclosed herein.

The front frame 104 is configured to rotatably support a first set of ground engaging members of which only one first ground engaging member 110 is visible in the side view of the machine depicted in FIG. 1. Similarly, the rear frame 106 is configured to rotatably support a second set of ground engaging members of which only one second ground engaging member 112 is visible in the side view of the machine depicted in FIG. 1. As shown in the illustrated embodiment of FIG. 1, these ground engaging members 110, 112 are embodied as wheels. However, in other embodiments, other suitable structures, for example, tracks may be used in lieu of the wheels disclosed herein.

The first and second ground engaging members 110, 112 are rotatably disposed on the frame to facilitate propulsion of the machine on a ground surface 114. In an example, this ground surface 114 may be associated with an underground mine site 115. Accordingly, one or more of these ground engaging members 110, 112 may be driven by drive power output by a prime mover 116. For example, referring to the illustrated embodiment of FIG. 1, the first set of ground engaging members 110 may be configured to receive drive power from the prime mover 116 while the second set of ground engaging members 112 are merely configured to facilitate movement of the rear frame 106 on the ground surface 114. The prime mover 116 disclosed herein may include, but is not limited to, an engine, an electric motor, or any other type of prime mover known to persons skilled in the art for propelling the machine 102 on the ground surface 114.

The machine 102 may also include a dump body 118 that is disposed on the rear frame 106. As shown, the dump body 118 may be pivotally connected to the rear frame 106 using one or more actuators, for example, a pair of hydraulic cylinders of which one hydraulic cylinder 120 is visible in the side view of the machine in FIG. 1. The dump body 118 is configured to carry materials, for example, ore, soil, or other earth materials therein so that the machine 102 can haul such materials from one location to another.

The present disclosure relates to a system 100 that is configured to monitor conditions associated with operation of the machine. Referring to FIG. 1, the system 100 includes at least one sensor that is disposed on the machine 102 and configured to output tri-axial acceleration data associated with the underground machine. As shown in the illustrated embodiment of FIG. 1, a pair of sensors 122, 124 may be provided to correspond with the front and rear frames 104, 106 of the machine 102. A first sensor 122 may be disposed on the front frame 104 while a second sensor 124 may be disposed on the rear frame 106 of the machine 102. In an embodiment, each of these sensors 122, 124 may be embodied in the form of an Inertial Measurement Unit (IMU) sensor, but could additionally, or optionally, include an accelerometer, a magnetometer and other types of sensing devices known in the art without deviating from the spirit of the present disclosure.

Further, as shown, the system 100 is also configured to include at least one controller 126 that is disposed in communication with the pair of sensors 122, 124. Referring to the illustrated embodiment of FIG. 1, the at least one controller 126 may be configured to include a first controller 128 that may be located on the machine 102 itself. Further, the at least one controller 126 may also include a second controller 130 that is remotely located from the machine 102 and disposed in communication with the first controller 128. The second controller 130 may be located, for example, in a remote monitoring or operator station 132 shown in the illustrated exemplary embodiment of FIG. 1. Although the first and second controllers 128, 130 are disclosed herein, it may be noted that fewer or more number of controllers may be disposed in communication with the sensors 122, 124 for performing functions consistent with the present disclosure.

It may also be noted that the controller 126 disclosed herein could include various software and/or hardware components that are configured to perform functions consistent with the present disclosure. As such, the controller 126 of the present disclosure may be a stand-alone controller or may be configured to co-operate with an existing electronic control module (ECU) (not shown) of the machine 102. Furthermore, it may be noted that the controller 126 may embody a single microprocessor or multiple microprocessors that include components for selectively and independently actuating specific system hardware, for example, an engine, brakes, a transmission system and other components that are associated with the machine 102.

Figure 2:
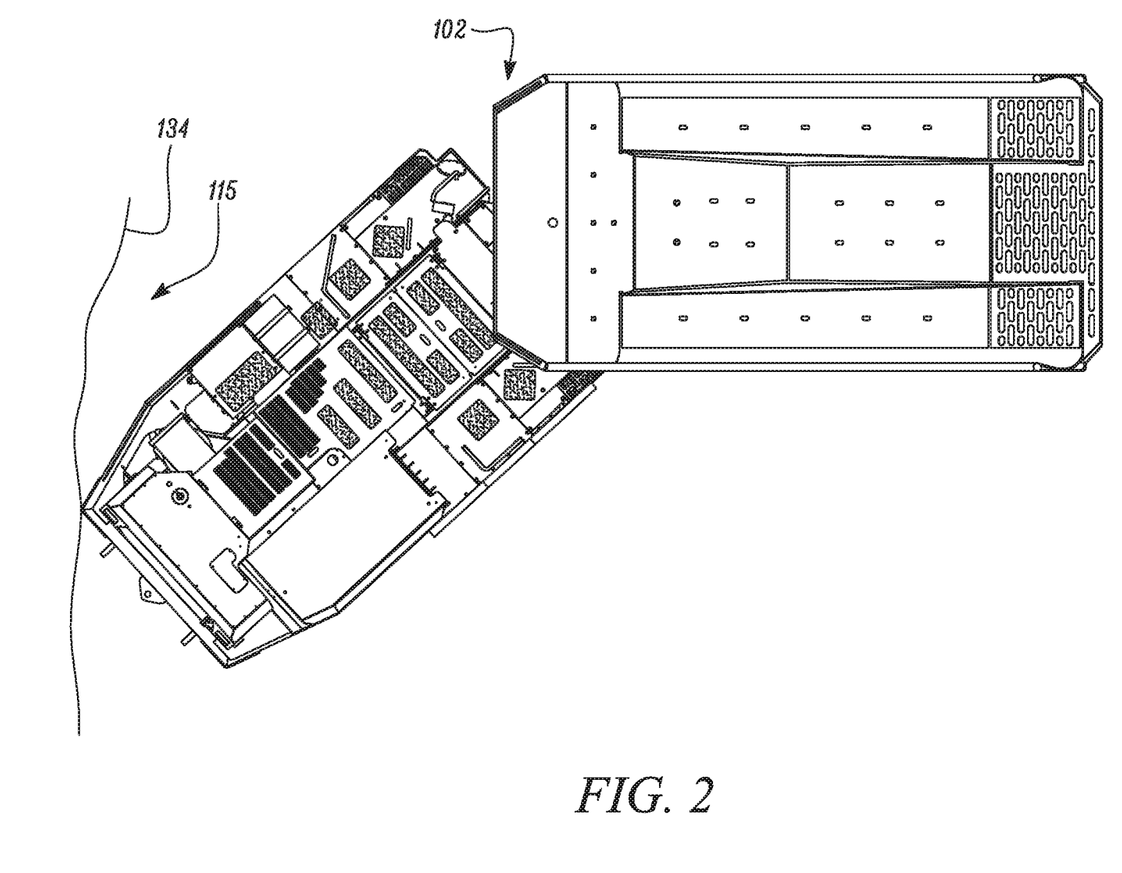
FIG. 2 is a top view of the exemplary machine positioned in a state of impact with a wall of an underground environment, according to an embodiment of the present disclosure.

In an exemplary scenario depicted in the view of FIG. 2, the front frame 104 of the machine 102 is shown positioned in a state of impact with a wall 134 of the underground mine site 115. In such a scenario, the pair of sensors 122, 124 may generate tri-axial acceleration data for forces that have been encountered during the impact by corresponding ones of the front and rear frames 104, 106. The controller 126 receives the generated tri-axial acceleration data from the pair of sensors 122, 124, and evaluates the received tri-axial acceleration data with at least one pre-defined criteria, explanation to which is made later herein.

Moreover, in embodiments herein, the controller 126 is also configured to determine whether the received tri-axial acceleration data is in excess of a threshold associated with the at least one pre-defined criteria based on the evaluation, and record an occurrence of an abnormality in the condition associated with operation of the underground machine 102 on the basis of whether the tri-axial acceleration data is in excess of the threshold associated with the at least one pre-defined criteria, explanation to which is also made later herein.

Figure 3:
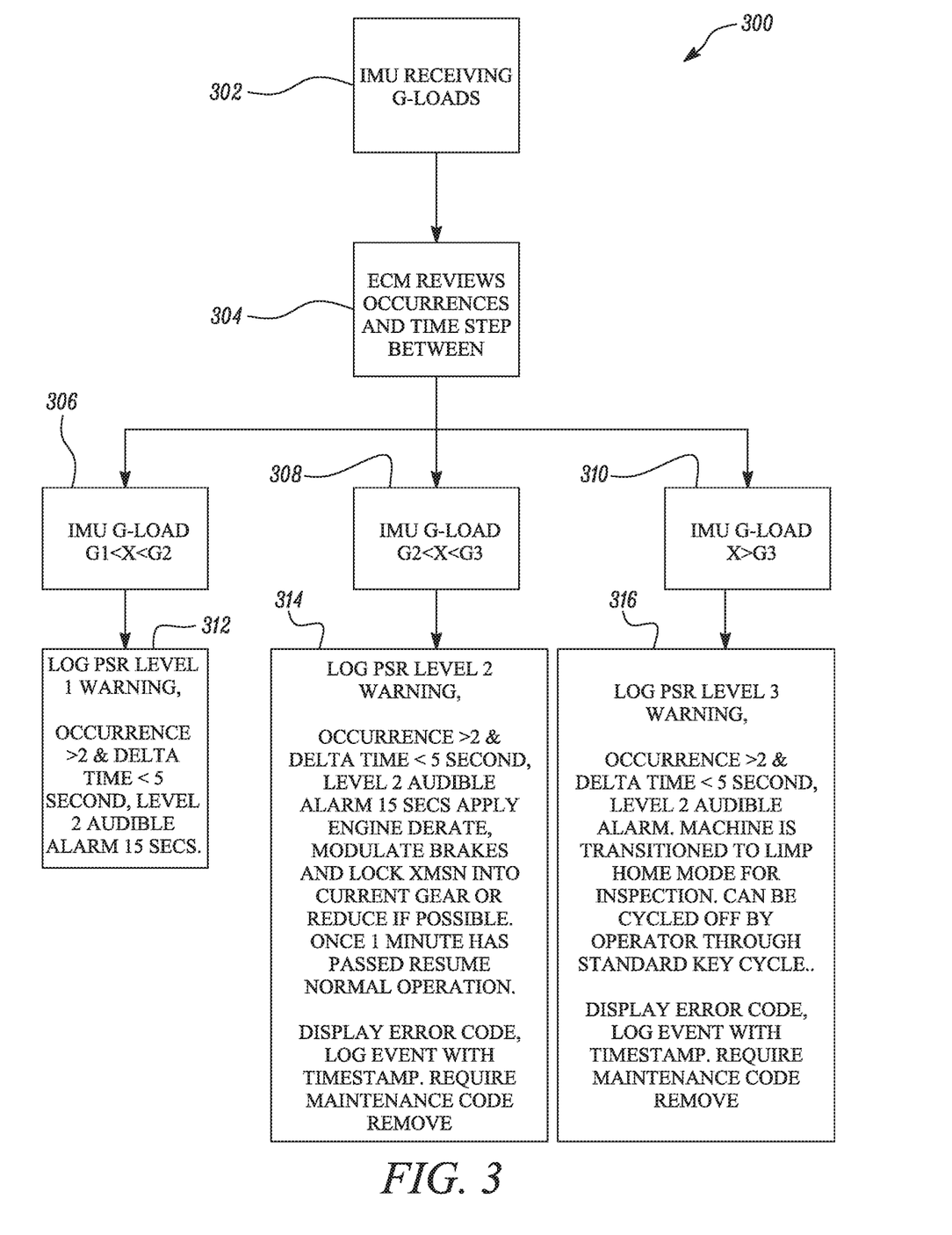
FIG. 3 is a representation of an exemplary schema showing functions that may be executed by a system for monitoring conditions associated with operation of the exemplary machine, according to an exemplary embodiment of the present disclosure.

Referring to the illustrated embodiment of FIG. 3, an exemplary schema 300 is illustrated. This schema 300 exemplarily depicts functions that could be associated with the system 100 for monitoring the condition associated with operation of the machine 102. As shown, at block 302, the sensors 122, 124 determine the forces encountered by corresponding ones of the front and rear frames 104, 106 and outputs the tri-axial acceleration data therefrom. At block 304, the controller 126 receives the generated tri-axial acceleration data from each of the sensors 122, 124. The controller 126 may also be configured with pre-defined criteria that may include a first criterion as depicted in blocks 306, 308, and 310. In embodiments herein, the first criterion may be configured to include whether a magnitude of the tri-axial acceleration data exceeds a first threshold. The first threshold disclosed herein may include a single value that can be exceeded by the tri-axial acceleration data, or alternatively, include a range of values within which the tri-axial acceleration data could lie, owing to the magnitude of forces encountered by each of the front and rear frames 104, 106 of the machine 102 during the impact.

In an exemplary first criterion shown at block 306, the controller 126 may determine whether the magnitude of the received tri-axial acceleration data lies within a first range of values, for example, between one and three units of magnitude. If the magnitude of the received tri-axial acceleration data lies within the first range of values, the controller 126 records the occurrence of an abnormality that is associated with the operation of the machine 102 at an associated memory 136 shown in the illustrated embodiment of FIG. 1.

Similarly, in another exemplary first criterion shown at block 308, the controller 126 may determine whether the magnitude of the tri-axial acceleration data lies within a second range of values, for example, between four and seven units of magnitude. If the magnitude of the tri-axial acceleration data lies within the second range of values, the controller 126 records the occurrence of the abnormality that is associated with the operation of the machine 102 corresponding to block 308 at the associated memory 136 shown in the illustrated embodiment of FIG. 1.

Similarly, in yet another exemplary first criterion shown at block 310, the controller 126 may determine whether the magnitude of the tri-axial acceleration data exceeds the first threshold which is given by way of a fixed value, for example, seven units of magnitude. If so, the controller 126 records the occurrence of the abnormality that is associated with the operation of the machine 102 corresponding to block 310 at the associated memory 136 shown in the illustrated embodiment of FIG. 1.

Referring to block 304, in an embodiment, the controller 126 may also be configured to determine an amount of time Δ that has lapsed between successive occurrences of abnormalities, for instance, when the machine 102 encounters two or more impacts with the wall 134 of the underground mine site 115. To that end, as shown in the exemplary embodiment of FIG. 1, the controller 126 may be provided with a timer module 138 that is configured to output a timestamp associated with the occurrence of each abnormality and such timestamps may be stored by the controller 126 at the associated memory 136. Moreover, the controller 126 may access such timestamps from the memory 136 to determine the amount of time Δ that has lapsed between the successive occurrences of abnormalities.

Additionally, or optionally, the pre-defined criteria configured to the controller 126 may also include a second criterion. In an exemplary second criterion shown at each of the blocks 312, 314, 316, the second criterion may be configured to include a determination by the controller 126 whether the amount of time Δ that has lapsed between successive occurrences is less than the second threshold. As shown, the second threshold depicted in each of the functional blocks 312, 314, and 316 is a fixed value, for example, 5 seconds. As the second criterion may be applicable when two or more occurrences of abnormalities occur in the condition associated with operation of the machine 102, for purposes of this disclosure, it may be noted that the second criterion can be regarded as being subsequent in order to the first criterion disclosed herein. However, in other embodiments of this disclosure, depending on specific requirements of an application, the pre-defined criteria may be configured such that the first and second criterion are disposed in a different order or arrangement than that disclosed herein.

Although the same amount of time Δ i.e., 5 seconds has been disclosed for implementing the second threshold across each of the blocks 312, 314, and 316 in the exemplary schema of FIG. 3, it may be noted that in other embodiments, the second threshold associated with the second criterion may differ, for example, in a conterminous manner with the first threshold associated with the first criterion from each of the blocks 306, 308, and 310 respectively. For instance, if the first criterion in block 306 has been satisfied, the controller 126 may proceed to determine, in block 312, if a span of time Δ between successive abnormalities is less than 5 seconds as shown in the exemplary schema of FIG. 3. However, if the first criterion in block 310 has been satisfied, then the controller may proceed to determine if the successive abnormalities have occurred in a time span Δ different than that for block 312 which corresponds to the first criterion from block 306. For example, if the first criterion in block 310 has been satisfied, then the controller 126 may proceed to determine, in an alternative to block 316, if the successive abnormalities have occurred in a time span Δ of say, 20 seconds, or even in an 8-hour operator shift.

In an exemplary embodiment depicted in the schema of FIG. 3, when the first criterion and the second criterion from any of the corresponding pairs of blocks 306, 312, or 308, 314, or 310, 316 have been satisfied, the controller 126 may notify an operator of the abnormalities in the condition associated with operation of the machine 102. As shown in the illustrated exemplary embodiment of FIG. 1, a notification device 140 is communicably coupled to the controller 126. This notification device 140 may be configured to provide a notification of the abnormality to the operator, and execute one or more corrective actions vis-à-vis the controller 126, as will be disclosed later herein.

In embodiments of this disclosure, the notification device 140 disclosed herein may include aural, visual, or haptic feedback-based devices. As shown in the illustrated embodiment of FIG. 1, the notification device 140 is embodied as a visual and aural based notification device, for example, a Graphical User Interface (GUI) 142 and one or more sound generating devices 144. Additionally, or optionally, the notification device 140 may also provide, vis-à-vis the controller 126, one or more notifications to the operator of the machine 102 in response to the abnormality. In an exemplary scenario, if the pre-defined criteria from blocks 306, 312 of the exemplary schema 300 of FIG. 3 have been satisfied, the controller 126 may, as shown in the block 312, command the notification device 140 to issue an alarm of a specified amplification for a pre-defined duration of time, for example, a level-2 alarm for 15 seconds.

In another exemplary scenario, if the pre-defined criteria from blocks 308, 314 of the exemplary schema 300 have been satisfied, the controller 126 may, as shown in the block 314, command the notification device 140 to issue an alarm for the pre-defined duration of time, for example, the level-2 alarm for 15 seconds. Additionally, or optionally, as shown in block 314, the controller 126 may also issue one or more corrective actions to specific system hardware components associated with the machine 102. For example, the controller 126 may de-rate an amount of power available from the prime mover 116 of the machine 102, lock the transmission system of the machine 102 in its current gear, or even downshift one or more gears in the transmission system.

In yet another exemplary scenario, if the pre-defined criteria from blocks 310, 316 of the exemplary schema 300 have been satisfied, the controller 126 may, as shown in the block 316, command the notification device 140 to issue an alarm for the pre-defined duration of time, for example, the level-2 alarm for 15 seconds. Additionally, or optionally, as shown in block 314, the controller 126 may also render the machine 102 in a 'limp home mode' in which one or more system specific system hardware would be prevented from being operated to its full capacity or one or more system specific system hardware may altogether be rendered in an inoperative state. For instance, the controller 126 may de-rate the amount of power output by the engine 102, and issue a notification, via the notification device 140, directing the operator to return the machine 102 to the maintenance station 146 for maintenance procedures to be carried out on the machine 102.

In order to mitigate any consequential contingencies due to the controller 126 issuing aggressive corrective actions when the pre-defined criteria from blocks 310, 316 of the exemplary schema 300 have been satisfied, for example, when the machine 102 may be rendered still at the underground mine site 115 and hence, blocks one or more tunnelways or passageways (not shown) in the underground mine site 115, it has been contemplated in embodiments herein that it may be possible for the operator to circumvent such aggressive corrective actions. These aggressive corrective actions may be 'cycled-off' or 'overridden' by the operator, for example, through removal and insertion of a key (not shown) that may be needed to render the machine 102 in an operative state, or by use of an override code that could be provided by the maintenance station 146 to the operator so that the operator can reset the controller 126 to resume operation of the machine 102. However, it is hereby contemplated that depending on mine architecture, this resumed operation of the machine 102 may be allowed by the controller 126 to persist for a pre-defined period, for example, 2 hours so that the operator can operatively move the machine 102 to the maintenance station 146.

Although embodiments of the present disclosure have been explained in reference to the first and second criterion, it should be noted that the first and second criterion is non-limiting of this disclosure. Rather, any number and type of criteria may be implemented to form the pre-defined criteria disclosed herein depending on specific requirements of a monitoring application.

INDUSTRIAL APPLICABILITY

In an additional embodiment of this disclosure, the controller 126 may also be configured to represent various data, including but not limited to, the tri-axial acceleration data relating to one or more consequences of the abnormality on the machine 102. The controller 126 may represent such data on the notification device 140 as shown exemplarily in FIG. 4, or other notification device/s (not shown) in lieu of or in addition to the disclosed notification device 140. The notification device 140 and the other notification device/s may be located in at least two of on-board the machine 102, at the remote monitoring or operator station 132, and at the maintenance station 146.

Figure 4:
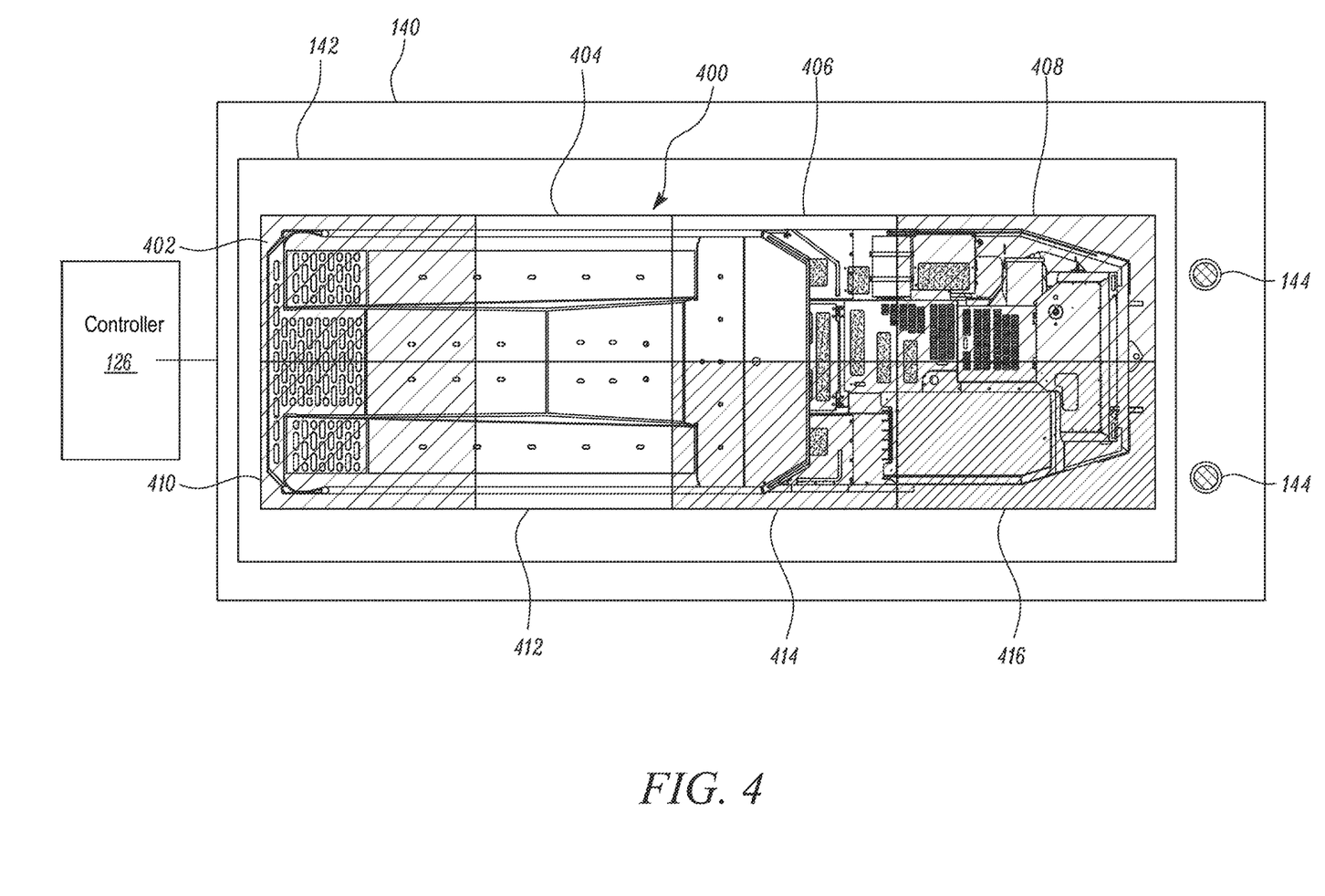
FIG. 4 is a diagrammatic view of a notification device and a controller depicting a pictorial representation of tri-axial acceleration data associated with the impact encountered by the machine in the view of FIG. 2, according to an exemplary embodiment of the present disclosure.

The controller 126 obtains the tri-axial acceleration data output by the sensors 122, 124 during the impact in the exemplary scenario of FIG. 2 and has rendered such tri-axial acceleration data in the form of a pictorial representation 400 on the notification device 140 as shown in the example of FIG. 4. Moreover, as shown in the example of FIG. 4, the controller 126 could also implement a shading technique to visually highlight different zones 402-416 on the pictorial representation 400 of the machine 102 where consequences of the abnormality from the impact may or may not exist on the machine 102. The term 'consequence' or 'consequences' disclosed herein may be construed as being indicative of an amount and/or direction of force experienced by a given zone 402-416 of the machine 102, or to say in another way, an amount of G-load experienced by the given zone 402-416. For example, through a shading density for each zone shown in the pictorial representation 400 of FIG. 4, the operator, a remote operator, and/or service personnel at the maintenance station can identify one or more zones 402-416 on the pictorial representation 400 of the machine 102, in this case, the UAT, that may require maintenance.

Zones that are devoid of shading, for example, zones 404, 406 and 412 may be ignored, while zones 402, 408, 410, 414, and 416 with varying shading densities may indicate various degrees of severity associated with corresponding consequences therein. The different shading densities may aid the operator, the remote operator, and/or service personnel to follow a maintenance hierarchy. This maintenance hierarchy may range from a minor to a major service routine or protocol pre-defined for the machine 102. A zone with less consequence may require a less number of specific pre-defined checks. For example, zone 414 may indicate that a mere physical inspection of the articulated joint is required. On the contrary, a zone with high consequence may require that a structural check be performed in that zone, for example, zone 416 may indicate that a determination of torque set on the articulated joint 108 is required, or a technical performance review of specific machine hardware, for example, one or more steering cylinders (not shown) of the machine be performed corresponding to one of the zones 416 shown in FIG. 4. Therefore, it will be appreciated by persons skilled in the art that a manner of dividing the machine 102 into different zones 402-416 by the controller 126 and utilizing different shading intensities for each of the zones 402-416 depending on the associated consequences may also dictate, in a fashion that is consistent or may vary depending on the machine type, a type of service routine or protocol that may be required. The representation, for example, the pictorial representation 400 of this tri-axial acceleration data provided by the system 100 of the present disclosure can therefore, help operators, remote operators, and/or service personnel to reduce costs, effort, and save time that would be typically incurred in performing preventative maintenance in the event of an abnormality.

Although the example of FIG. 4 discloses one of the many ways in which the controller 126 could represent the tri-axial acceleration data and a manner of utilizing that represented data for performing various activities such as deriving a type of preventative maintenance required, it may be noted that a scope of the present disclosure is not limited thereto. Rather, it has been envisioned that the scope of the present disclosure i.e., the monitoring activity as shown in block 502 in the exemplarily illustrated workflow 500 of FIG. 5 may be extended so as to be applied in assisting the operator, the remote operator, and/or service personnel in performing other activities such as, but not limited to, fleet management shown in block 504, mine management shown in block 506, and other performance and/or productivity enhancing activities such as improving the operator's behavior with the machine/s 102 as shown in block 508, and other aspects directed to a safety of the machine/s 102 as shown in block 510.

Figure 5:
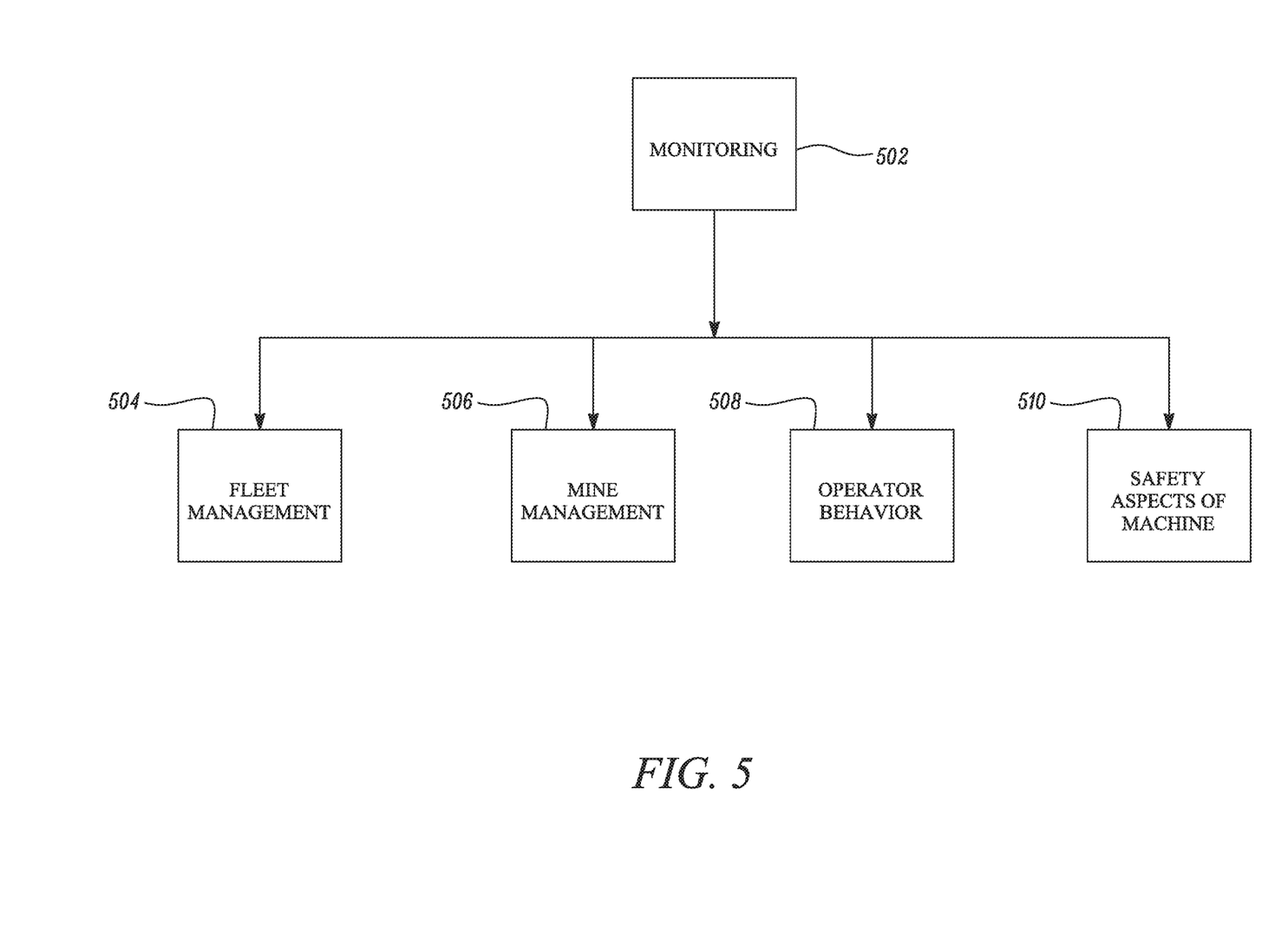
FIG. 5 is a hierarchical tree illustrating secondary activities or functions that can be performed by carrying out the monitoring activity of the present disclosure, according to an exemplary embodiment of the present disclosure.

In one exemplary scenario, a partially obstructed tunnelway or passageway could be forcing operator/s of the machine/s 102 to steer the machine/s 102 tightly or aggressively about a corner (not shown) in the underground mine site 115 thereby allowing high G-loads to be experienced at specific zones 402-416 on the machine/s 102. In the case of a mine management activity shown in block 506, if the controllers 126 from two or more machine/s 102 record similar tri-axial acceleration data and their corresponding timestamps are suggestive of a specific location in the underground mine site 115, then trend/s in the tri-axial acceleration data and their corresponding timestamps may be detected by the controller 126. Based on the detected trend/s, the controller 126 may, via the notification device 140, notify service personnel associated with mine management to perform maintenance at the suggested location in the underground mine site 115. Therefore, the system 100 of the present disclosure can direct the mine management to clear such obstructions to facilitate an improved productivity from use of the machine/s 102.

In another exemplary scenario, the partially obstructed tunnelway or passageway in the underground mine site 115 could be causing the machine/s 102 to encounter an impact each time the machine 102 attempts to traverse the obstruction. With detection of trend/s in the tri-axial acceleration data from two or more machine/s 102, the system 100 of the present disclosure can also help fleet management personnel to decisively allow or prevent further machine/s 102 to be deployed into operation thus saving time, costs, and effort that would have been otherwise incurred.

Figure 6:
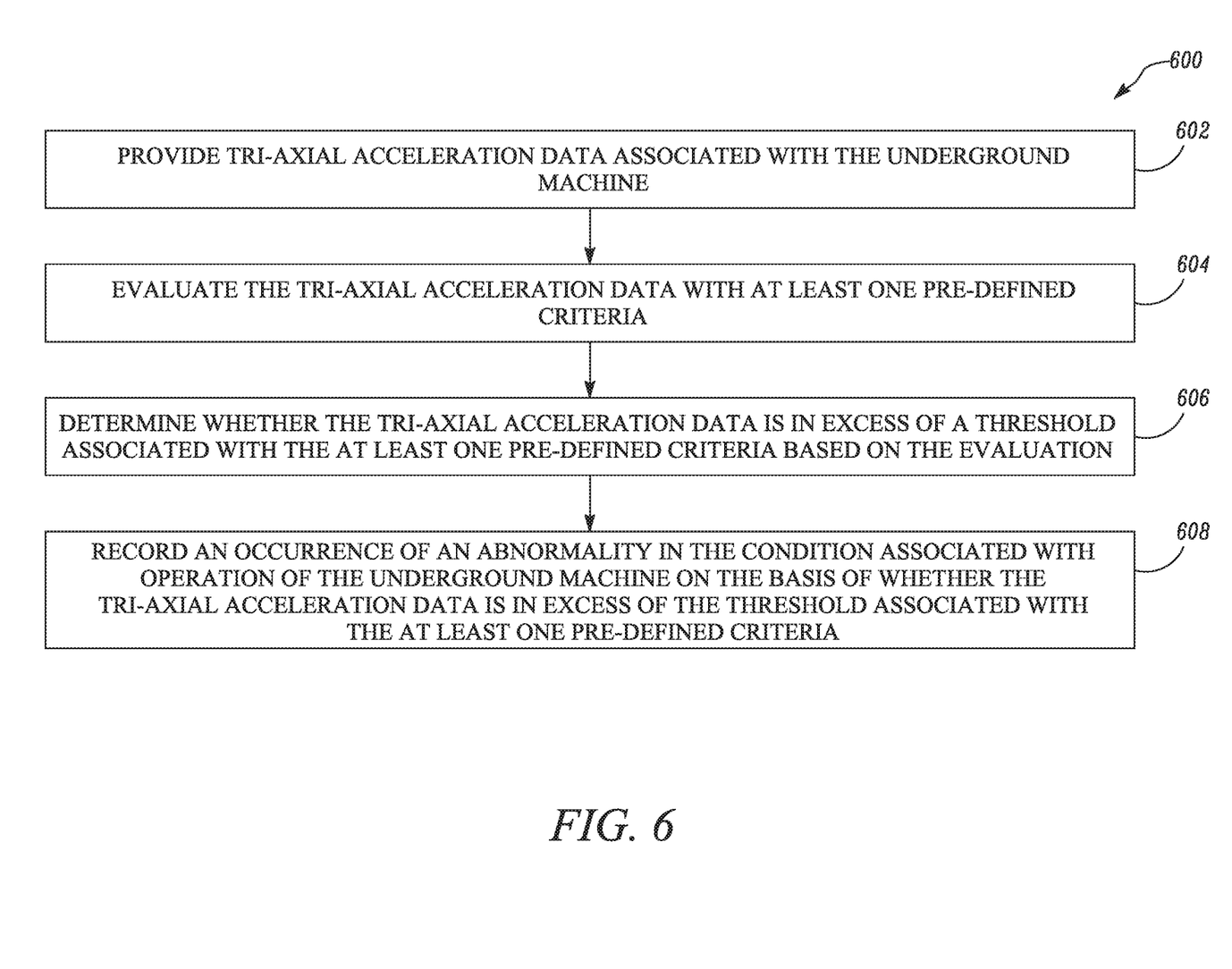
FIG. 6 is a flowchart of a method for monitoring conditions associated with operation of the exemplary machine, according to an embodiment of the present disclosure.

FIG. 6 illustrates a flowchart depicting a method 600 for monitoring conditions associated with operation of the underground machine 102, in accordance with an embodiment of the present disclosure. As shown, at step 602, the method 600 includes providing, by means of the sensors 122, 124, tri-axial acceleration data associated with the underground machine 102. Further, at step 604, the method 600 also includes evaluating, by means of the controller 126, the tri-axial acceleration data with at least one pre-defined criteria. Additionally, at step 606, the method 600 further includes determining, by means of the controller 126, whether the tri-axial acceleration data is in excess of the threshold associated with the at least one pre-defined criteria based on the evaluation. Furthermore, at step 608, the method 600 also includes recording the occurrence of the abnormality in the condition associated with operation of the underground machine 102 on the basis of whether the tri-axial acceleration data is in excess of the threshold associated with the at least one pre-defined criteria.

Embodiments of the present disclosure have applicability for use in monitoring conditions associated with operation of an underground machine. In fact, the monitoring activity disclosed herein can be integrated with other mine or machine related functions to aid a performance of other activities including, but not limited to, mine management, fleet management, and the like. Embodiments of the present disclosure, when implemented in underground machines, can also improve a reliability associated with operation of the machine thereby leading to an improved productivity of the machine and lowering costs that were previously incurred with unsupervised operation of the machine.

While aspects of the present disclosure have been particularly shown and described with reference to the embodiments above, it will be understood by those skilled in the art that various additional embodiments may be contemplated by the modification of the disclosed vehicles, systems and methods without departing from the spirit and scope of what is disclosed. Such embodiments should be understood to fall within the scope of the present disclosure as determined based upon the claims and any equivalents thereof.

What is claimed is:

1. A system for monitoring a condition associated with operation of an underground machine that includes a frame, the system comprising:
   a sensor disposed on the machine, the sensor configured to output tri-axial acceleration data associated with a force encountered by the frame of the underground machine during an occurrence of an abnormality of operation of the underground machine, wherein the abnormality is an impact of the frame with a wall;
   at least one controller disposed in communication with the sensor, the at least one controller configured to:
   determine whether a magnitude of the tri-axial acceleration data associated with the force encountered by the frame during the impact with the wall satisfies one of a plurality of threshold relationships, each threshold relationship a range of values in which the magnitude lies or a single value that the magnitude exceeds, each threshold relationship associated with a warning level; and
   record, if the magnitude satisfies one of the plurality of threshold relationships, for the occurance of the abnormality the warning level that is associated with the threshold relationship satisfied in the determination.

2. The system of claim 1, wherein the sensor is an inertial measurement unit (IMU) sensor.

3. The system of claim 1, wherein the at least one controller includes: at least one first controller disposed on the frame of the machine, and a second controller remotely located from the machine and disposed in communication with the at least one first controller.

4. The system of claim 1, wherein the at least one controller is configured to record a duration between successive occurrences of impact.

5. The system of claim 1 further comprising a notification device disposed in communication with the at least one controller, wherein the at least one controller is further configured to conduct at least one of:
   notify an operator of the machine, via the notification device, of the abnormality, and
   execute a corrective action in response to the abnormality.

6. The system of claim 5, wherein the corrective action includes at least one of: derating an amount of power available from a prime mover of the machine, locking a transmission system of the machine in a current gear, and downshifting one or more gears in the transmission system.

7. The system of claim 5, wherein the notify further includes directing the operator of the machine, via the notification device, to return the machine for maintenance.

8. The system of claim 5, wherein the notification device includes at least one of: visual, aural, and haptic feedback-based devices.

9. The system of claim 1, further comprising a notification device disposed in communication with the controller, in which the controller is further configured to: notify an operator of the machine, via the notification device, when a successive occurrence of the abnormality is recorded and a duration between the successive occurrence and the occurrence prior to the successive occurrence is less than a pre-determined span of time.

10. A method for monitoring a condition associated with operation of an underground machine that includes a frame, the method comprising:

providing, using a sensor, tri-axial acceleration data associated with a force encountered by the frame of the underground machine during an occurrence of an abnormality of operation of the underground machine, wherein the abnormality is an impact of the frame with a wall;

determining whether a magnitude of the tri-axial acceleration data associated with the force encountered by the frame during the impact with the wall satisfies one of a plurality of threshold relationships, each threshold relationship a range of values in which the magnitude lies or a single value that the magnitude exceeds, each threshold relationship associated with a warning level; and recording, if the magnitude satisfies one of the plurality of threshold relationships, for the occurance of the abnormality the warning level that is associated with the threshold relationship satisfied in the determination.

11. The method of claim 10, wherein the sensor is an inertial measurement unit (IMU) sensor.

12. The method of claim 10, wherein the controller includes: at least one first controller disposed on the frame of the machine, and a second controller remotely located from the machine and disposed in communication with the at least one first controller.

13. The method of claim 10 further comprising recording a duration between successive occurrences of impact.

14. The method of claim 10 further comprising conducting at least one of:

notifying, via a notification device, an operator of the machine of the abnormality, and executing, vis-à-vis the controller, a corrective action in response to the abnormality.

15. The method of claim 14, wherein the corrective action includes at least one of: derating an amount of power available from a prime mover of the machine, locking a transmission system of the machine in a current gear, and downshifting one or more gears in the transmission system.

16. The method of claim 14, wherein the notifying, via the notification device, the operator of the machine includes directing the operator of the machine to return the machine for maintenance.

17. The method of claim 14, wherein the notification device includes at least one of: visual, aural, and haptic feedback-based devices.

18. The method of claim 10 further comprising: notifying an operator of the machine, via a notification device, when a successive occurrence of the abnormality is recorded and a duration between the successive occurrence and the occurrence prior to the successive occurrence is less than a pre-determined span of time.

19. The system of claim 1 further comprising a notification device disposed in communication with the controller, in which the controller is further configured to:

render, on a notification device, a pictorial representation of the machine that visually identifies by shading one or more zones on the pictorial representation of the machine where a G-load from the impact was experienced by the machine, the shading having a density that indicates a degree of severity of the impact.

20. The method of claim 10 further comprising:

rendering, on a notification device, a pictorial representation of the machine that visually identifies by shading one or more zones on the pictorial representation of the machine where a G-load from the impact was experienced by the machine, the shading having a density that indicates a degree of severity of the impact.

* * * * *